US011179758B2

(12) United States Patent
Ding et al.

(10) Patent No.: US 11,179,758 B2
(45) Date of Patent: Nov. 23, 2021

(54) METHOD FOR STABILIZING FLUORIDES AND ARSENIC IN SOIL

(71) Applicant: CHINESE ACADEMY OF ENVIRONMENTAL PLANNING, Beijing (CN)

(72) Inventors: Zhenyu Ding, Beijing (CN); Ning Sun, Beijing (CN); Zhandong Hao, Beijing (CN); Nuchao Xu, Beijing (CN); Zongwen Zhang, Beijing (CN); Hongxia Hu, Beijing (CN); Fengping Liu, Beijing (CN); Yankun Zhang, Beijing (CN); Xin Zhou, Beijing (CN); Huilin Yin, Beijing (CN)

(73) Assignee: CHINESE ACADEMY OF ENVIRONMENTAL PLANNING, Beijing (CN)

( * ) Notice: Subject to any disclaimer, the term of this patent is extended or adjusted under 35 U.S.C. 154(b) by 0 days.

(21) Appl. No.: 17/253,121

(22) PCT Filed: Jan. 8, 2020

(86) PCT No.: PCT/CN2020/070825
§ 371 (c)(1),
(2) Date: Dec. 17, 2020

(87) PCT Pub. No.: WO2021/031515
PCT Pub. Date: Feb. 25, 2021

(65) Prior Publication Data
US 2021/0276059 A1 Sep. 9, 2021

(30) Foreign Application Priority Data
Aug. 21, 2019 (CN) .......................... 201910774543.1

(51) Int. Cl.
*B09C 1/08* (2006.01)
*C09K 17/06* (2006.01)
*C09K 17/40* (2006.01)

(52) U.S. Cl.
CPC ................ *B09C 1/08* (2013.01); *C09K 17/06* (2013.01); *C09K 17/40* (2013.01)

(58) Field of Classification Search
CPC ............ B09C 1/08; C09K 17/06; C09K 17/40
See application file for complete search history.

(56) References Cited

U.S. PATENT DOCUMENTS

| | | | | |
|---|---|---|---|---|
| 6,258,018 B1 * | 7/2001 | Pal | ........................ | C04B 28/04 588/256 |
| 6,543,964 B2 * | 4/2003 | Chowdhury | .............. | A62D 3/33 405/128.5 |
| 8,475,080 B2 * | 7/2013 | Kim | ........................ | B09C 1/02 405/128.75 |
| 8,814,471 B2 * | 8/2014 | Farone | ...................... | B09C 1/08 405/128.15 |
| 2002/0022756 A1 * | 2/2002 | Chowdhury | .............. | B09C 1/08 588/15 |
| 2012/0138530 A1 * | 6/2012 | Burba, III | .............. | B01D 15/00 210/638 |
| 2016/0288085 A1 * | 10/2016 | Itaya | ........................ | B09C 1/00 |

FOREIGN PATENT DOCUMENTS

| | | |
|---|---|---|
| CN | 1535885 A | 10/2004 |
| CN | 1689721 A | 11/2005 |
| CN | 103785348 A | 5/2014 |
| CN | 105215051 A | 1/2016 |
| CN | 106336869 A | 1/2017 |
| CN | 107617637 A * | 1/2018 |
| CN | 107617637 A | 1/2018 |
| CN | 108277007 A | 7/2018 |
| CN | 109226246 A | 1/2019 |
| CN | 109365514 A | 2/2019 |
| CN | 109727560 A | 5/2019 |
| CN | 109731901 A | 5/2019 |

(Continued)

OTHER PUBLICATIONS

Jinyan Yang, et al., The Research Status of Fluorine Contamination in Soils of China, Ecology and Environmental Sciences, 2017, pp. 506-513, vol. 26 No. 3.
NY-T1377-2007, Determination of pH in Soil, 2007, Ministry of Agriculture of the People's Republic of China.
GB/T 17138-1997, Soil Quality—Determination of Copper, Zinc—Flame Atomic Absorption Spectrophotometry, 1997, State Environmental Protection Bureau; State Bureau of Technical Supervision.
GB/T 22105.2-2008, Soil Quality—Analysis of Total Mercury, Arsenic and Lead Contents—Atomic Fluorescence Spectrometry, 2008, General Administration of Quality Supervision, Inspection and Quarantine of the People's Republic of China; China National Standardization Management Committee.
GB/T 17141-1997, Soil Quality—Determination of Lead, Cadmium—Graphite Furnace Atomic Absorption Spectrophotometry, 1997, State Environmental Protection Bureau; State Bureau of Technical Supervision.

(Continued)

*Primary Examiner* — Frederick L Lagman
*Assistant Examiner* — Stacy N Lawson
(74) *Attorney, Agent, or Firm* — Bayramoglu Law Offices LLC

(57) ABSTRACT

A method for stabilizing fluorides and arsenic in soil includes: step 1, adding a calcium-containing compound to the soil contaminated by fluorides and arsenic, stirring uniformly, and standing for curing; step 2, adding an iron-containing compound to the mixture obtained in step 1, stirring uniformly, and standing for curing; and step 3, adding water to the mixture obtained in step 2, optionally adding a pH adjusting agent to adjust the gravimetric water content to 30%-40%, and standing for curing. The method uses calcium-containing and iron-containing compounds in a step-by-step manner, makes full use of the advantages of different passivation materials, combines the advantages of all reagents, and establishes an economical, efficient and environmentally friendly method for stabilizing fluorides and arsenic in soil to achieve effective remediation of contaminated soil.

3 Claims, No Drawings

(56) References Cited

FOREIGN PATENT DOCUMENTS

| | | |
|---|---|---|
| CN | 109796984 A | 5/2019 |
| CN | 110560473 A | 12/2019 |
| EP | 0055493 A1 | 7/1982 |
| EP | 2196092 A1 | 6/2010 |

OTHER PUBLICATIONS

HJ 873-2017, Soil—Determination of Water Soluble Fluoride and Total Fluoride—Ion Selective Electrode Method, 2017, Ministry of Environmental Protection.

GB15618-1995, Environmental Quality Standard for Soils, 1995, State Environmental Protection Bureau; State Bureau of Technical Supervision.

Soil Environmental Quality Standard for Agricultural Land, 1995, Ministry of Environmental Protection; General Administration of Quality Supervision, Inspection and Quarantine.

Xiao-Feng Chen, et al., Progress on Arsenic Immobilization /Stabilization with Chemical Precipitation Method, Bulletin of The Chinese Ceramic Society, 2015, vol. 34 No. 12.

National General Survey of Soil Contamination—Technical Specification of Soil Sample Analysis and Test Methods, Part I: 19-1 Extractable State of Elements—Calcium Chloride Method, pp. 5-180.

* cited by examiner

METHOD FOR STABILIZING FLUORIDES AND ARSENIC IN SOIL

CROSS REFERENCE TO THE RELATED APPLICATIONS

This application is the national phase entry of International Application No. PCT/CN2020/070825, filed on Jan. 8, 2020, which is based upon and claims priority to Chinese Patent Application No. 201910774543.1, filed on Aug. 21, 2019, the entire contents of which are incorporated herein by reference.

TECHNICAL FIELD

The present invention relates to the field of soil remediation in the technical field of environmental engineering, and particularly relates to a method for stabilizing fluorides and arsenic in soil.

BACKGROUND

For a long time, due to the lack of environmental protections for soil, soil contamination accumulated over the years is emerging gradually. Moderate and severe soil pollution has occurred in some areas, posing a serious threat to the quality and safety of agricultural products and human health. Soil pollution affects the survival and reproduction of plants, soil animals and microorganisms, and endangers normal soil ecological processes and ecosystem service functions. Pollutants in the soil may undergo conversion and migration, and then enter surface water, groundwater, and atmospheric environment, affecting the quality of surrounding environmental media. Remediation methods for heavy metal-contaminated soil have been explored for a long time.

Remediation methods include physical remediation, chemical remediation, and bioremediation, and these methods can be combined with each other to bring heavy metal contaminated soil to a safe level. Commonly used remediation techniques include excavation and landfill, soil dressing method, passivation, electrokinetic remediation, and electrothermal remediation. Passivation technology is often used to remediate the heavy metal-contaminated soil because of advantages thereof such as simplicity, efficiency and speediness. Passivation means adding a passivating agent to the soil to reduce the mobility and bioavailability of heavy metals in the soil, thereby reducing the toxicity of heavy metals to achieve a remediation effect.

There are a plurality of passivating agents for treating each pollutant, and each passivating agent is generally capable of treating a plurality of pollutants. Therefore, after the actual measurement of soil pollutants, in general, a plurality of passivating agents that can be applied to the pollutants are mixed and then passivated. The objective of the present invention is to treat the soil contaminated by fluorides and heavy metal arsenic. In the prior art, CHEN Xiaofeng et al. introduced the research progress on stabilization to remove arsenic by chemical precipitation method, and showed that a plurality of substances such as iron- or calcium-containing substances can react with arsenate to form a stable precipitate.

YANG Jinyan et al. introduced the fluorine contamination in soils of China and remediation methods of fluorine-contaminated soils.

Chinese Patent No. CN201210419212 and CN20041003841 disclose methods for treating arsenic and fluorine in soils, which also treat the soil by mixing with iron- or calcium-containing substances.

Chinese Patent No. CN20171146172 discloses a soil remediation agent comprising ferric sulfate and calcium chloride, but does not mention the treatment of fluorine in the soil. Although this soil remediation agent may appear to have the effect of passivating the fluorine in the soil according to the nature of reagents, the soil remediation agent is still used by mixing a plurality of reagents. Because each reagent has different physical and chemical properties and purpose when treating pollutants, mixing these reagents under a unified chemical environment to treat pollutants may result in reagents not being in their optimal state at the time of treatment, and even different substances may have a counteracting effect. Therefore, it is highly desirable to provide a new method of stabilizing soil contaminated by fluorides and heavy metal arsenic.

SUMMARY

The present invention uses calcium-containing and iron-containing compounds in a step-by-step manner, makes full use of the advantages of different passivation materials, combines the advantages of all reagents, and establishes an economical, efficient and environmentally friendly method for stabilizing fluorides and arsenic in soil to achieve effective remediation of contaminated soil.

To achieve the above objective, the present invention provides a method for stabilizing fluorides and arsenic in soil, including the following steps:

step 1, adding a calcium-containing compound to the soil contaminated by fluorides and arsenic, stirring uniformly, and standing for curing;

step 2, adding an iron-containing compound to the mixture obtained in step 1, stirring uniformly, and standing for curing; and step 3, adding water to the mixture obtained in step 2, optionally adding a pH adjusting agent to adjust a gravimetric water content to 30%-40%, and standing for curing.

Preferably, the calcium-containing compound is at least one of calcium chloride and calcium nitrate.

Preferably, the iron-containing compound is at least one of ferric sulfate, ferrous sulfate, ferric chloride, and iron oxide.

Preferably, the pH adjusting agent is at least one of calcium oxide, calcium hydroxide, and magnesium hydroxide.

Preferably, the calcium-containing compound is calcium chloride, the iron-containing compound is ferric sulfate, and the pH adjusting agent is calcium oxide.

Preferably, an amount of the calcium-containing compound is 0.5%-3% of a weight of the soil contaminated by the fluorides and the arsenic; an amount of the iron-containing compound is 0.5%-3% of the weight of the soil contaminated by the fluorides and the arsenic; the calcium-containing compound and the iron-containing compound have a weight ratio of 3:1 to 1:3.

Preferably, an amount of the pH adjusting agent is 0.1%-1% of the weight of the soil contaminated by the fluorides and the arsenic.

Preferably, the curing in step 1 lasts for 0.5-1.5 h; the curing in step 2 lasts for 0.5-1.5 h; and the curing in step 3 lasts for 3-6 days.

Preferably, the soil contaminated by the fluorides and the arsenic is an acid soil at a pH value of 4.5-6.5.

Preferably, the soil contaminated by the fluorides and the arsenic comes from a chemically polluted plant area.

Compared with the existing soil remediation technology, the present invention has the following advantages.

(1) In the present invention, the calcium-containing compound and the iron-containing compound are successively mixed with the soil contaminated by fluorides and arsenic, so that the two compounds can be subjected to their optimal chemical reaction environment, respectively; thus achieving a better stabilization effect compared with the simultaneous addition of the above compounds or the successive addition of the iron-containing compound and the calcium-containing compound. Calcium ions released by the calcium-containing compound can react with arsenate and fluoride ions in the soil to produce precipitates of calcium arsenate and calcium fluoride. After the reaction, the pH of the soil decreases, and the solubility product of the calcium arsenate increases with the decreasing pH. This indicates that the calcium arsenate that has been produced may release some arsenates as the pH of the soil decreases, while ferric arsenate produced by the reaction of ferric ions released by the iron-containing compound with arsenate under acidic conditions is more stable than the calcium arsenate. Therefore, ferric ions can passivate the arsenate released by the calcium arsenate during the pH decrease; ferric ions even partly convert the calcium arsenate into ferric arsenate and release the calcium ions to achieve sustained release of calcium ions, thereby enabling long-lasting passivation of the fluoride ions. If the above two compounds are added at the same time, calcium arsenate and ferric arsenate will be produced respectively; this makes it difficult to have sufficient ferric ions to passivate the released arsenates after the soil pH drops, and will not have the long-acting effect of sustained-release calcium ions on fluoride ions. If the order of addition of the above two substances is reversed, the ferric ions will react with arsenate first to produce ferric arsenate stable under acidic conditions, and cause the pH of the soil to drop, while the calcium-containing compound will react in a relatively inefficient environment, resulting in a decreased passivation effect. Therefore, it can be seen that the order of addition of the calcium-containing compound and the iron-containing compound has a key influence on the passivation effect. The order of addition used in the present invention enables the two reagents to support each other functionally, exerts an optimal effect of each reagent, and obtains the maximum soil passivation effect.

(2) The present invention optimizes and screens specific calcium-containing and iron-containing compounds, and finds that calcium chloride and ferric sulfate can obtain an optimal passivation effect. The above two reagents are inexpensive and have the optimal passivation effect. YANG Jinyan et al. have shown that calcium salts in solid form and the calcium-containing compound that cause a pH rise are inferior to soluble calcium chloride or calcium nitrate in stabilizing fluorine, which may be related to the solubility product of precipitated substances and the increase in pH value. The present application finds that the effect of calcium chloride is relatively better than that of calcium nitrate through research, which may be related to the higher water absorption of calcium chloride or a difference between substances produced by nitrate and chloride ions. Poor passivation effect of ferrous sulfate is because the reactions of ferrous ions and ferric ions with arsenate are different under acidic conditions, while the fact that the effect of ferric chloride is not as good as that of ferric sulfate may be related to pH. DENG Tiantian reported that flocculation of ferric chloride under weakly acidic to alkaline conditions achieved an optimal arsenic-removing effect. Iron oxide may affect the reaction rate due to a slow release of ferric ions. In the present application, an optimal combination of calcium chloride and ferric sulfate is obtained through screening of various substances, so as to achieve a further improvement of the passivation effect on soil contaminated by fluorides and arsenic.

(3) The present invention can further use a pH adjusting agent after adding calcium chloride and ferric sulfate. The pH value of the soil is reduced after the above two reagents are added to the soil. If the soil per se is acidic and the pH thereof is reduced substantially, risk of soil acidification will be posed easily. Therefore, an appropriate amount of the pH adjusting agent is added to control the pH within a reasonable range. The pH adjusting agent plays a role in increasing the pH, which can make the calcium arsenate that has been produced more stable and further improve the passivation effect on the soil.

DETAILED DESCRIPTION OF THE EMBODIMENTS

The present invention will be further described below in combination with specific embodiments, so that the present invention can be better understood and implemented by those skilled in the art, but the embodiments given are not intended to limit the present invention.

Heavy metal-contaminated soil samples in the following embodiments of the present invention were from a polluted area of a chemical plant in Zhongxiang. Mixed soil samples were collected in the 0.8-1.0 cm soil layer of the surface of the area to be remediated for stabilization experiments. The test soil was reddish-brown in color, was miscellaneous fill containing construction waste, and was a silty clay-based mixed sample. Basic physicochemical properties and related parameters of the test soil are shown in Table 1.

TABLE 1

Properties of contaminated soil

| Property | Parameter | Test method |
|---|---|---|
| pH | 5.3 | *Determination of pH in Soil* (NY-T1377-2007) |
| Cu content, mg/kg | 316.1 | *Soil Quality - Determination of Copper, Zinc - Flame Atomic* |
| Zn content, mg/kg | 130.3 | *Absorption Spectrophotometry* (GB/T 17138-1997) |
| As content, mg/kg | 157 | *Soil Quality - Analysis of Total Mercury Arsenic and Lead Contents - Atomic Fluorescence Spectrometry* (CB/T 22105.2-2008) |
| Cd content, mg/kg | 0.915 | *Soil Quality - Determination of Lead, Cadmium - Graphite Furnace Atomic Absorption Spectrophotometry* (GB/T 17141-1997) |
| F content, mg/kg | 1,161 | *Soil - Determination of Water Soluble Fluoride and Total* |
| Water soluble F content, mg/kg | 44.41 | *Fluoride - Ion Selective Electrode Method* (HJ 873-2017) |

TABLE 1-continued

Properties of contaminated soil

| Property | Parameter | Test method |
|---|---|---|
| Available As concent | 8.30 | *National General Survey of Soil Contamination - Technical Specification of Soil Sample Analysis and Test Methods*, Part I: 19-1 Extractable State of Elements - Calcium Chloride Method |

Level III standard in the Environmental Quality Standard for Soils (GB15618-1995) was used as a screening value (arsenic 30 mg/kg, copper 400 mg/kg, zinc 500 mg/kg, and cadmium 1.0 mg/kg); the Soil Environmental Quality Standard for Agricultural Land (Third Exposure Draft) was used as a supplement to the screening value of this survey (fluoride (water soluble) 5 mg/kg). Data analysis showed that the soil was contaminated by fluorides and arsenic, among which the arsenic content exceeded the standard by 5.23 times, the total fluorine content was far higher than the average soil fluorine content in Chine of 440 mg/kg, and the water soluble fluoride exceeded the standard by 8.88 times. Therefore, the test soil was contaminated by arsenic and fluorides.

Embodiment 1

Step 1, 15 g of calcium chloride was added to 1 kg of soil contaminated by fluorides and arsenic and stirred uniformly, and stood and cured for 1 h;
Step 2, 15 g of ferric sulfate was added to the mixture obtained in step 1 and stirred uniformly, and stood and cured for 1 h;
Step 3, water was added to the mixture obtained in step 2, the gravimetric water content was adjusted to 35%, and stood and cured for 4 days.

Embodiment 2

Step 1, 10 g of calcium chloride was added to 1 kg of soil contaminated by fluorides and arsenic and stirred uniformly, and stood and cured for 1.5 h;
Step 2, 18 g of ferric sulfate was added to the mixture obtained in step 1 and stirred uniformly, and stood and cured for 0.5 h;
Step 3, water was added to the mixture obtained in step 2, the gravimetric water content was adjusted to 35%, and stood and cured for 6 days.

Embodiment 3

Step 1, 30 g of calcium chloride was added to 1 kg of soil contaminated by fluorides and arsenic and stirred uniformly, and stood and cured for 0.5 h;
Step 2, 10 g of ferric sulfate was added to the mixture obtained in step 1 and stirred uniformly, and stood and cured for 1.5 h;
Step 3, water was added to the mixture obtained in step 2, the gravimetric water content was adjusted to 35%, and stood and cured for 3 days.

Embodiment 4

Step 1, 15 g of calcium chloride was added to 1 kg of soil contaminated by fluorides and arsenic and stirred uniformly, and stood and cured for 1 h;
Step 2, 15 g of ferrous sulfate was added to the mixture obtained in step 1 and stirred uniformly, and stood and cured for 1 h;
Step 3, water was added to the mixture obtained in step 2, the gravimetric water content was adjusted to 35%, and stood and cured for 4 days.

Embodiment 5

Step 1, 15 g of calcium chloride was added to 1 kg of soil contaminated by fluorides and arsenic and stirred uniformly, and stood and cured for 1 h;
Step 2, 15 g of ferric chloride was added to the mixture obtained in step 1 and stirred uniformly, and stood and cured for 1 h;
Step 3, water was added to the mixture obtained in step 2, the gravimetric water content was adjusted to 35%, and stood and cured for 4 days.

Embodiment 6

Step 1, 15 g of calcium chloride was added to 1 kg of soil contaminated by fluorides and arsenic and stirred uniformly, and stood and cured for 1 h;
Step 2, 15 g of iron oxide was added to the mixture obtained in step 1 and stirred uniformly, and stood and cured for 1 h;
Step 3, water was added to the mixture obtained in step 2, the gravimetric water content was adjusted to 35%, and stood and cured for 4 days.

Embodiment 7

Step 1, 15 g of calcium nitrate was added to 1 kg of soil contaminated by fluorides and arsenic and stirred uniformly, and stood and cured for 1 h;
Step 2, 15 g of ferric sulfate was added to the mixture obtained in step 1 and stirred uniformly, and stood and cured for 1 h;
Step 3, water was added to the mixture obtained in step 2, the gravimetric water content was adjusted to 35%, and stood and cured for 4 days.

Embodiment 8

Step 1, 15 g of calcium chloride was added to 1 kg of soil contaminated by fluorides and arsenic and stirred uniformly, and stood and cured for 1 h;
Step 2, 15 g of ferric sulfate was added to the mixture obtained in step 1 and stirred uniformly, and stood and cured for 1 h;
Step 3, water and 3 g of calcium oxide were successively added to the mixture obtained in step 2, the gravimetric water content was adjusted to 35%, and stood and cured for 4 days.

Comparative Example 1

Step 1, 15 g of calcium chloride and 15 g of ferric sulfate were added to 1 kg of a soil contaminated by fluorides and arsenic and stirred uniformly, and stood and cured for 2 h;
Step 2, water was added to the mixture obtained in step 1, the gravimetric water content was adjusted to 35%, and stood and cured for 4 days.

Comparative Example 2

Step 1, 15 g of ferric sulfate was added to 1 kg of soil contaminated by fluorides and arsenic and stirred uniformly, and stood and cured for 1 h;
Step 2, 15 g of calcium chloride was added to the mixture obtained in step 1 and stirred uniformly, and stood and cured for 1 h;
Step 3, water was added to the mixture obtained in step 2, the gravimetric water content was adjusted to 35%, and stood and cured for 4 days.

Comparative Example 3

Step 1, 15 g of calcium carbonate was added to 1 kg of soil contaminated by fluorides and arsenic and stirred uniformly, and stood and cured for 1 h;
Step 2, 15 g of ferric sulfate was added to the mixture obtained in step 1 and stirred uniformly, and stood and cured for 1 h;
Step 3, water was added to the mixture obtained in step 2, the gravimetric water content was adjusted to 35%, and stood and cured for 4 days.
The results of the study on stabilized soil obtained by sampling and testing in embodiments 1 to 8 and comparative examples 1 to 3 are shown in Table 2.

TABLE 2

Test results of stabilization methods

|  | Water soluble fluoride, mg/kg | Water soluble fluoride, mg/kg |
| --- | --- | --- |
| Contaminated soil | 8.30 | 44.41 |
| Embodiment 1 | 0.36 | 5.66 |
| Embodiment 2 | 0.57 | 6.37 |
| Embodiment 3 | 0.24 | 4.97 |
| Embodiment 4 | 0.86 | 9.61 |
| Embodiment 5 | 0.54 | 6.34 |
| Embodiment 6 | 0.62 | 7.65 |
| Embodiment 7 | 0.39 | 6.31 |
| Embodiment 8 | 0.29 | 5.33 |
| Comparative Example 1 | 1.07 | 17.11 |
| Comparative Example 2 | 1.48 | 21.96 |
| Comparative Example 3 | 0.98 | 30.6 |

It can be seen from the results of embodiments 1 to 8 that the stabilization method of the present application has an excellent targeted passivation effect, and can effectively passivate the soil contaminated by fluorides and arsenic.

It can be seen from comparative examples 1 to 3 that the stabilization of arsenic in the soil is mainly related to calcium and iron elements in reagents, and the stabilization of fluorine is mainly related to calcium element in reagents, but the interaction between calcium and iron leads to a correlation between the stabilization of fluorine and iron content. Therefore, the interaction between the above two reagents determines the stabilization effect of arsenic and fluorine in the soil.

By comparing embodiment 1 and comparative examples 1-2, it can be found that the interaction between calcium chloride and ferric sulfate has a close relationship with the order of addition thereof. Prior addition of calcium chloride enables calcium ions to react with arsenate and fluoride ions at an initial pH. As the reaction proceeds, decreased pH of the soil makes calcium arsenate unstable, causing the arsenate to enter the soil again. Ferric sulfate added at this time makes ferric arsenate produced at this pH more stable, so that the arsenate is further passivated. The calcium arsenate partly releases some calcium ions when being converted into more stable ferric arsenate, so that fluoride ions in the soil can be further removed, enabling the calcium ions to have a sustained-release effect.

If the above two reagents are added at the same time or in a reverse order, the above-mentioned functional mutual support will not or seldom occur, and the interaction between the two reagents will no longer exist or will be seldom achieved, thereby showing a relatively poor passivation effect with respect to the stabilization effect. It can be known from the above experiments and possible principle analysis that the order of adding calcium-containing and iron-containing compounds is a key factor for improving soil stabilization.

Embodiments 1, 4-7, and comparative example 3 describe the screening of specific chemical reagents. It can be seen that different iron- and calcium-containing reagents have different treatment effects. For iron-containing reagent screening, it can be seen that an optimal effect is achieved when using ferric sulfate. Since ferrous sulfate releases ferrous ions, which are different from ferric ions when reacting with arsenate and may lead to a difference in effect due to the slow reaction rate. The effect of ferric chloride is slightly different from that of ferric sulfate. As speculated by the prior art, the difference may be caused by the environmental pH value. The reason why iron oxide is less effective may be related to the speed of supplying ferric ions. For calcium-containing reagent screening, it can be seen that an optimal effect is achieved when using calcium chloride. The effect of calcium nitrate may be related to a difference of the higher water absorption between calcium chloride and calcium nitrate or a difference between substances produced by nitrate and chloride ions. Due to the different dissolution and solubility product, calcium carbonate shows a very large effect gap.

By comparing embodiments 1 and 8, it can be found that after adding calcium chloride and ferric sulfate, decreasing pH of the soil may be unfavorable to chemical reactions, and may even lead to soil acidification. Therefore, a small amount of calcium oxide is added as a pH adjusting agent, which can maintain the chemical reaction environment of the soil within a reasonable range, and can help stabilize the calcium arsenate that has been produced, which may be more beneficial for the stabilization effect, and can avoid the problem of soil acidification.

By adding a calcium-containing compound and then an iron-containing compound, the present application realizes the interaction between the two reagents for treating arsenic and fluorine, and achieves a better soil stabilization effect. The present application further screens out calcium chloride and ferric sulfate to achieve the maximization of the above-mentioned interaction, and further addition of calcium oxide as a pH adjusting agent can avoid the drop of pH beyond the optimal reaction range, as well as the problem of soil acidification, achieving an excellent stabilization effect.

The above-mentioned embodiments are merely preferred embodiments for fully explaining the present invention, and the protection scope of the present invention is not limited thereto. Equivalent substitutions or variations made by those skilled in the art on the basis of the present invention all fall within the protection scope of the present invention. The protection scope of the present invention is subject to the claims.

What is claimed is:

1. A method for stabilizing fluorides and arsenic in a soil, the method comprising the following steps:
    step 1, adding a calcium-containing compound to the soil contaminated by the fluorides and the arsenic, stirring uniformly, and standing for curing to obtain a first mixture;
    step 2, adding an iron-containing compound to the first mixture obtained in step 1, stirring uniformly, and standing for curing to obtain a second mixture; and
    step 3, adding water to the second mixture obtained in step 2, optionally adding a pH adjusting agent to adjust a gravimetric water content to 30%-40%, and standing for curing; wherein
    the calcium-containing compound is at least one selected from the group consisting of calcium chloride and calcium nitrate;
    the iron-containing compound is at least one selected from the group consisting of ferric sulfate, ferrous sulfate, ferric chloride, and iron oxide;
    the pH adjusting agent is at least one selected from the group consisting of calcium oxide, calcium hydroxide, and magnesium hydroxide;
    an amount of the calcium-containing compound is 0.5%-3% of a weight of the soil contaminated by the fluorides and the arsenic;
    an amount of the iron-containing compound is 0.5%-3% of the weight of the soil contaminated by the fluorides and the arsenic;
    the calcium-containing compound and the iron-containing compound have a weight ratio of 3:1 to 1:3;
    an amount of the pH adjusting agent is 0.1%-1% of the weight of the soil contaminated by the fluorides and the arsenic;
    the curing in step 1 lasts for 0.5-1.5 h; the curing in step 2 lasts for 0.5-1.5 h; and the curing in step 3 lasts for 3-6 days;
    the soil contaminated by the fluorides and the arsenic is an acid soil at a pH value of 4.5-6.5.

2. The method according to claim 1, wherein the calcium-containing compound is calcium chloride, the iron-containing compound is ferric sulfate, and the pH adjusting agent is calcium oxide.

3. The method according to claim 1, wherein the soil contaminated by the fluorides and the arsenic comes from a chemically polluted plant area.

* * * * *